United States Patent
Hinton et al.

(10) Patent No.: US 8,013,471 B2
(45) Date of Patent: Sep. 6, 2011

(54) APPARATUS AND METHOD FOR MANAGING A BACKUP POWER SUPPLY FOR AN AIRCRAFT COCKPIT VOICE RECORDER

(75) Inventors: Mark Lee Hinton, Issaquah, WA (US); Steven Robert Hjermstad, Snohomish, WA (US)

(73) Assignee: Universal Avionics Systems Corporation, Tucson, AZ (US)

(*) Notice: Subject to any disclaimer, the term of this patent is extended or adjusted under 35 U.S.C. 154(b) by 338 days.

(21) Appl. No.: 12/402,859

(22) Filed: Mar. 12, 2009

(65) Prior Publication Data

US 2010/0231049 A1   Sep. 16, 2010

(51) Int. Cl.
*H02J 9/00* (2006.01)
*H02J 7/00* (2006.01)
(52) U.S. Cl. .......................... 307/64; 320/167
(58) Field of Classification Search .......... 320/166, 320/167; 307/64, 9.1
See application file for complete search history.

(56) References Cited

U.S. PATENT DOCUMENTS

| | | | |
|---|---|---|---|
| 5,818,125 A * | 10/1998 | Manchester | 307/66 |
| 5,864,221 A | 1/1999 | Downs et al. | |
| 6,009,356 A | 12/1999 | Monroe | |
| 6,462,507 B2 | 10/2002 | Fisher, Jr. | |
| 6,741,896 B1 * | 5/2004 | Olzak et al. | 700/82 |
| 2006/0152085 A1 | 7/2006 | Flett et al. | |
| 2007/0033431 A1 | 2/2007 | Pecone et al. | |
| 2007/0033432 A1 | 2/2007 | Pecone et al. | |
| 2009/0033294 A1 * | 2/2009 | Odajima et al. | 320/166 |

OTHER PUBLICATIONS

"Maxwell Technologies to Demonstrate Ultracapacitors' Application as Independent Power Source for "Black Box" Flight Data Recorders," Business Wire, San Diego, Apr. 23, 1999.

* cited by examiner

*Primary Examiner* — Michael Rutland Wallis
(74) *Attorney, Agent, or Firm* — Quarles & Brady LLP; George E. Haas (57) ABSTRACT

Charge on a storage capacitor in a backup power supply is managed by discharging the capacitor into an aircraft recorder that is to be powered when a primary power source fails. During the discharging, a first amount of energy discharged from the capacitor is measured along with the length of the discharge time. The first amount of energy and the discharge time are employed to define a target energy level to which the capacitor should be charged to enable the backup power supply to adequately power aircraft recorder. Then charging of the capacitor commences while a second amount of energy stored in the capacitor is measured. The capacitor charging terminates when the second amount of energy reaches the target energy level. Definition of the target energy level also may take into account variation in temperature of the capacitor.

25 Claims, 5 Drawing Sheets

APPARATUS AND METHOD FOR MANAGING A BACKUP POWER SUPPLY FOR AN AIRCRAFT COCKPIT VOICE RECORDER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to vehicle recording systems, such as aircraft cockpit voice recorders; and more particularly to backup power supplies which enable such recording systems to operate in the absence of primary power in the vehicle.

2. Description of the Related Art

The United States Federal Aviation Administration (FAA) requires that most commercial aircraft be equipped with a crash-survivable cockpit voice recorder (CVR). This recorder collects vital flight information that provides evidence for the reconstruction and analysis in the event of an accident. The CVR is usually powered from an electrical bus of the aircraft.

During an accident, the aircraft may lose electrical power that normally supplies the CVR, thereby causing this device to terminate recording critical information long before the culmination of the accident. As a result, the FAA regulations now mandate that all aircraft, that are required to carry CVRs, be fitted with an independent power source that is located with the recorder and that activates automatically to power the recorder for ten minutes plus or minus one minute of operation, whenever the primary aircraft power is unavailable, either due to manual shutdown or electrical system failure.

Existing backup power supplies store electrical energy in either a battery or a capacitor bank. Capacitors tend to be preferred as being more able to be repeatedly cycled through charge and deep discharge operations without significantly affecting the life of that storage device.

Nevertheless, the capacitance of large capacitor banks decreases over time due to the applied voltage level, as well as temperature to which they are subjected. The voltage level has a significant impact on the rate at which the capacitance decreases. For example, an individual capacitor that is rated for 2.5 volts can experience a 20% capacitance reduction, if continuously charged to 2.5 volts for two years. Then again, that same capacitor, if only charged to 2.1 volts can last twenty years at that same temperature. Therefore, it is desirable to maintain the voltage on the capacitor at as low a level as possible to provide sufficient backup power to meet the FAA ten minute requirement.

SUMMARY OF THE INVENTION

A backup power supply has a capacitor and provides electrical power to a consuming device, such as an aircraft audio recorder, when power from a primary source is unavailable. It often is desired that the backup power supply be capable of powering the consuming device for a given period of time after loss of power from the primary source.

The capacitor is charged to a given level. Thereafter, the capacitor is discharged into the consuming device while measuring the amount of time during which the discharging occurs. Upon completion of discharging the capacitor, a target energy level is defined in response to the amount of time.

When charging of the capacitor commences again, an amount of charge energy that is stored in the capacitor is measured, such as periodically for example. The capacitor charging terminates when the measured amount of charge energy reaches the target energy level. Because the target energy level is defined based on the length of time that the capacitor discharged, the target energy level preferably was established so that the capacitor is sufficiently charged to ensure that the backup power supply is capable of powering the consuming device for the given period of time.

In a preferred implementation of this method, the amount of energy that is discharged from the capacitor also is measured. Here, the target energy level also is defined as a function of the amount of that discharged energy. For example, the target energy is defined as the amount of discharge energy adjusted based on deviation of the discharge time from a reference time value. The reference value may be the given period of time desired that the backup power supply be able to furnish power to the consuming device. This ensures that the capacitor will be sufficiently charged to power the consuming device for the given period of time, without overcharging the capacitor which may decrease its useful life.

An aspect of the present invention is that the energy level to which the capacitor is charged is adjusted based on the temperature proximate to the backup power supply. Preferably the energy level is decreases in proportion to an amount that the temperature exceeds a threshold value.

DETAILED DESCRIPTION OF THE INVENTION

Figure 1:
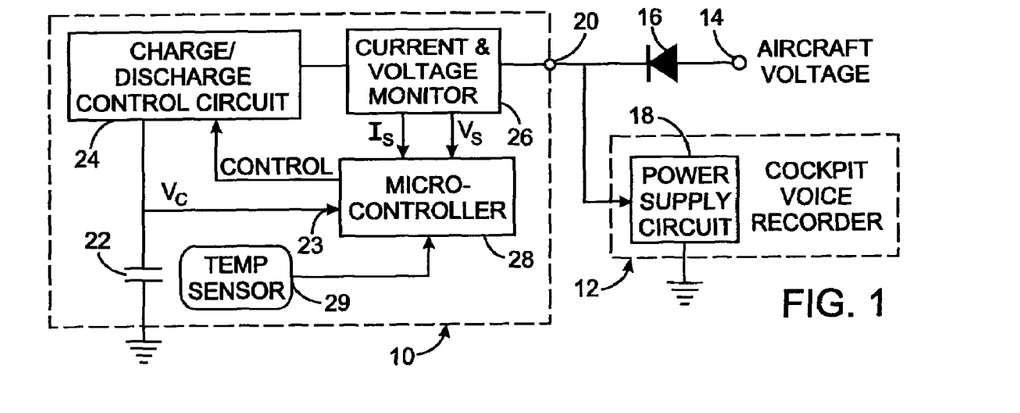
FIG. 1 is a schematic block diagram of a backup power supply connected to an aircraft cockpit voice recorder.

With initial reference to FIG. 1, a backup power supply 10 is provided to furnish electrical power to a cockpit voice recorder (CVR) 12 when current from the aircraft electrical system on DC supply bus 14 is unavailable. Unavailability of the supply bus current can result from an electrical failure during an emergency or the electrical circuits in the aircraft being shut down by the flight crew, as normally occurs after the final flight of a day. Normally the aircraft electrical current is applied from aircraft power supply bus 14 through a diode 16 to the CVR 12, and specifically to an internal power supply circuit 18 therein. Although the backup power supply 10 is being described in the context of powering a cockpit voice recorder, the inventive concepts may be applied to backup power supplies for powering other types of equipment, such as fight data recorders.

An aircraft electrical current also is applied to a terminal 20 of the backup power supply 10 and charges a storage device within the backup power supply 10, as will be described. In the event that power from the aircraft power supply bus 14 is unavailable, the backup power supply 10 furnishes current via terminal 20 to power the CVR 12.

The backup power supply 10 includes a capacitor 22 that stores electrical energy for subsequent use in powering the CVR 12 when current from the aircraft power supply bus is unavailable. The storage device is represented by a single capacitor 22 with the understanding that a bank of capacitors typically will be employed to provide sufficient electrical storage capacity. The term "capacitor", as used herein, covers not only a single capacitor, but a plurality of capacitors connected to function together in storing and thereafter supplying electrical energy.

The backup power supply 10 includes a charge/discharge control circuit 24 which controls the application of electrical voltage from the aircraft power supply bus 14 to the capacitor 22 and also controls the discharge of energy from that capacitor through terminal 20 of the backup power supply 10. The charge/discharge control circuit 24 includes a converter that employs conventional pulse width modulation to convert the voltage level on aircraft power supply bus 14 to a desired voltage level for charging the capacitor and, during a power bus failure, to convert the capacitor voltage to a desired level for powering the CVR 12. The supply voltage $V_S$ and current $I_S$ flowing between the capacitor 22 and the backup power supply terminal 20 are measured by a current and voltage monitor 26. Operation of the backup power supply 10 and specifically the charge/discharge control circuit 24 is governed by a microcontroller 28 in response to that measured current and voltage. In particular, the microcontroller has an output that is connected to a charge and discharge circuit to command that latter component to connect the capacitor 22 to the terminal 20 and to define operation of the PWM converter. The microcontroller 28 executes a software control program that governs operation of the charge/discharge control circuit 24 in response to signals received at various inputs of the microcontroller. The microcontroller receives the supply voltage $V_S$ and current $I_S$ measurements provided by the current and voltage monitor 26 and also directly senses the voltage $V_C$ across the capacitor 22 via input 23 to an internal analog to digital converter. A temperature sensor 29 provides the microcontroller 28 with a signal that indicates the temperature of the capacitor 22.

The microcontroller 28 is a microcomputer based device that includes a memory for storing a software program, that governs the operation of the backup power supply 10, and for storing data used and generated by that program.

Figure 2:
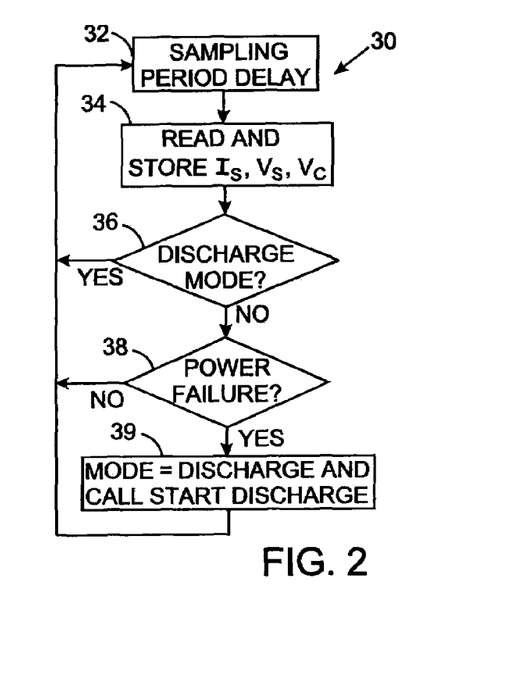
FIG. 2 is a flowchart of a software interrupt routine executed by a processor in the backup power supply to sample current and voltage levels.

In addition to executing the control program that governs the overall operation of the backup power supply 10, the microcontroller 28 therein also executes an interrupt routine that samples data for use by the control program. With reference to FIG. 2, the interrupt routine 30 is executed periodically based on a software interrupt timer executed by the microcontroller 28. For example, the interrupt routine 30 waits at step 32 for ten milliseconds, at the expiration of which, the levels of the supply voltage $V_S$ and the supply current $I_S$ at the power supply terminal 20, as measured by the current and voltage monitor 26, are read and stored at step 34. At that time, the voltage $V_C$ across the capacitor 22 is also read and stored by the microcontroller.

Interrupt routine then advances to step 36, at which a determination is made whether the microcontroller 28 is commanding the charge/discharge control circuit 24 to operate in the Discharge mode in which voltage from the capacitor 22 is applied to the power supply terminal 20. If that is the case, the interrupt routine 30 returns immediately to step 32 to delay for another sampling period. Otherwise the execution branches to step 38 where the microcontroller examines the power supply voltage $V_S$, which should be greater than the minimum aircraft voltage, e.g., 18.5 volts, of the aircraft power supply bus 14. If substantially the nominal aircraft power supply bus voltage is found, the interrupt routine returns to step 32. If significantly less that that nominal voltage exists, a power failure is declared at step 38 and at step 39, the backup power supply operating mode is set to Discharge and a subroutine entitled "Start Discharge" is called. That subroutine will be described in detail subsequently. Thus, the interrupt route 30 periodically reads the supply voltage and current and the capacitor voltage and store those readings for use by the control program.

Figure 3A:
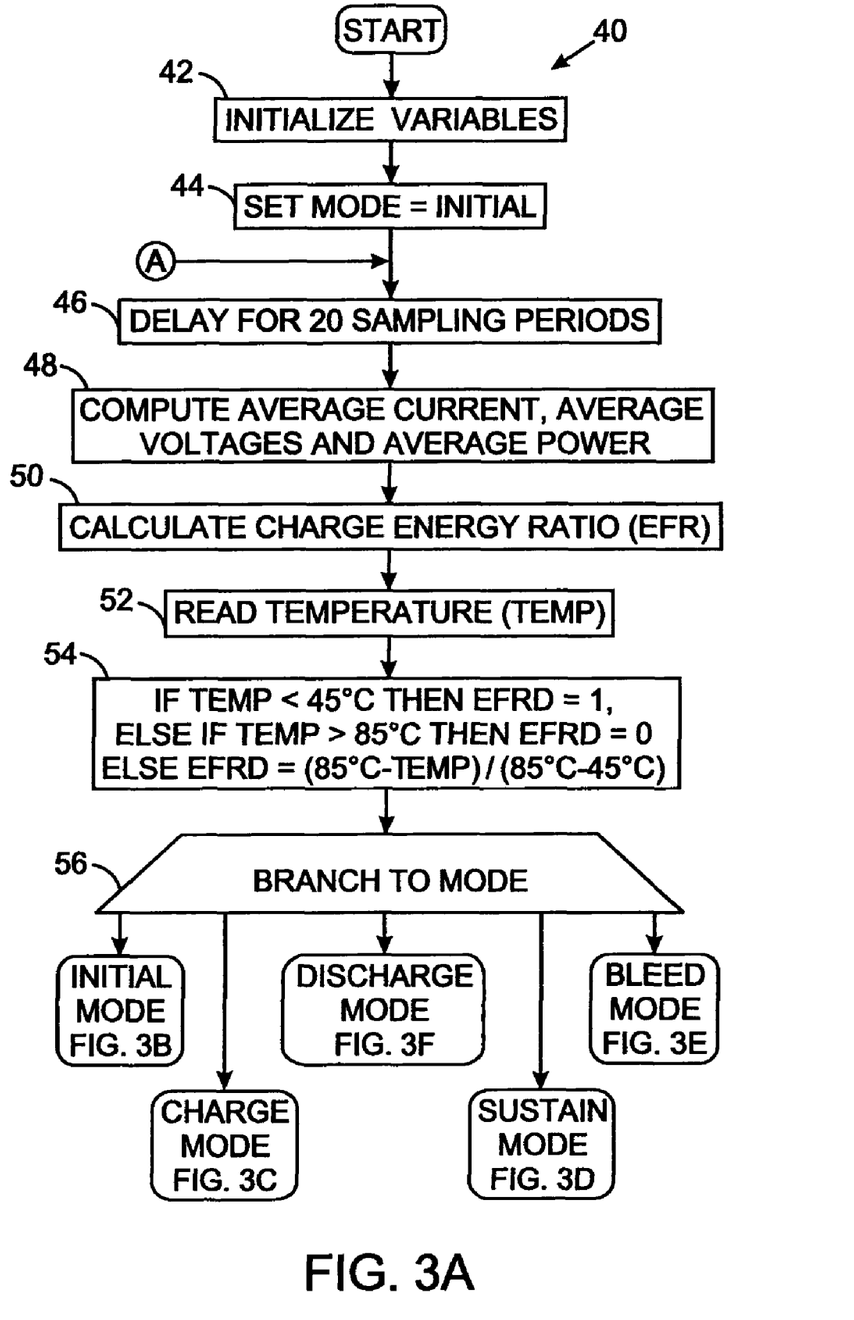
FIGS. 3A, B, C, D, E and F form a flowchart of a software program for controlling the charging and discharging of the backup power supply.

The control program 40 executed by the microcontroller 28 commences at step 42 on the flow chart of FIG. 3A, at which different variables used by the control program are initialized. As will be described, some of those variables have values set and stored in a non-volatile memory of the microcontroller by a previous execution of the control program, however, during the first execution of that program after installation, a set of default values are read from the non-volatile memory. Thereafter at step 44, a variable that indicates the operating mode of the backup power supply 10 is set to the Initial mode.

At step 46, further execution of the control program is delayed for twenty sampling periods of the timed interrupt routine 30 in order to acquire twenty sets of voltage and current samples from the backup power supply. Next at step 48, the twenty sets of samples of each of the supply current $I_S$, supply voltage $V_S$, and capacitor voltage $V_C$ are individually averaged to produce average values that then are used as representing those electrical parameters. In addition, each pair of supply voltage and supply current samples are multiplied to produce a power measurement and then the resultant twenty power measurements are averaged to produce an average power value Ps for subsequent use. Next at step 50, a charge energy ratio (EFR) is calculated according to the expression:

$$EFR = \frac{(V_C)^2 - (V_{MIN})^2}{(V_C \text{FULL})^2 - (V_{MIN})^2} \quad (1)$$

where $V_{MIN}$ is the minimum capacitor voltage, e.g. 0.7 volts, at which satisfactory operation of the CVR 12 can occur, and $V_C$ FULL is a previously defined target charge voltage for a fully charged capacitor 22, which value was read from memory at step 34 when the control program 40 commenced. The capacitor energy ratio EFR indicates the amount that the capacitor 22 is presently charged as a proportion of its full charge.

At step 52, the microcontroller 28 reads the temperature value produced by the temperature sensor 29. The FAA regulations requires that the backup power supply 10 only has to be able to power the CVR 12 at temperatures less than 70° C. Above that temperature, the backup power supply is not required to be functional. Nevertheless, the present backup power supply 10 provides short term backup power capability for operating temperatures above 70° C. Assume that the maximum temperature to which the capacitor 22 can be exposed and function satisfactorily is 85° C., which serves as an upper limit for the backup power supply operation. The amount of the backup power supply's capability is determined at step 54 by a desired value (EFRD) for the capacitor charge energy ratio. Specifically, if the present temperature is less than 70° C., then the value of EFRD is set equal to one, however, when the temperature is in excess of 85° C., the value of EFRD is set equal to zero. In between those two temperatures, the desired charge energy ratio EFRD is set to a proportion that the temperature is above the 70° C. level by the expression:

$$EFRD = 1 - \left(\frac{85°\text{ C.}-\text{TEMP}}{85°\text{ C.}-70°\text{ C.}}\right) \quad (2)$$

where TEMP is the temperature of the capacitor as sensed at step 52. Then at step 56, the control program 40 branches to a program section for the present operating mode of the backup power supply 10 as indicated by the MODE variable.

Figure 3B:
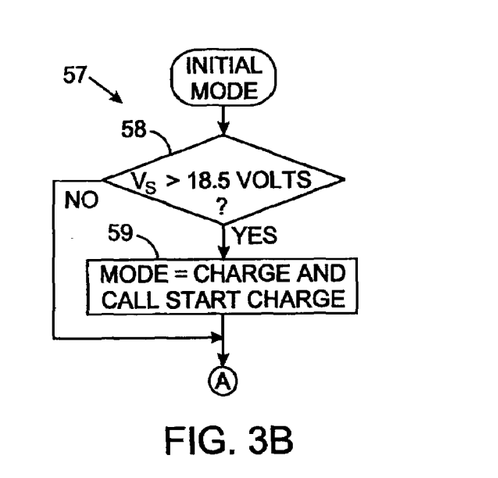

Operation commences in the Initial mode 57 which is shown in FIG. 3B. The Initial mode occurs only until the voltage on the aircraft power supply bus 14 reaches its minimum operating level, which in this exemplary system is 18.5 volts, as sensed at step 58. As long as the aircraft power supply bus is below that voltage level, the Initial mode 57 returns to step 46 on FIG. 3A. The looping through steps 46-58 continues until the aircraft power supply bus 14 reaches the minimum voltage level, at which time, the mode variable is set to the Charge mode and the Start Charge subroutine is called at step 59.

Figure 4:
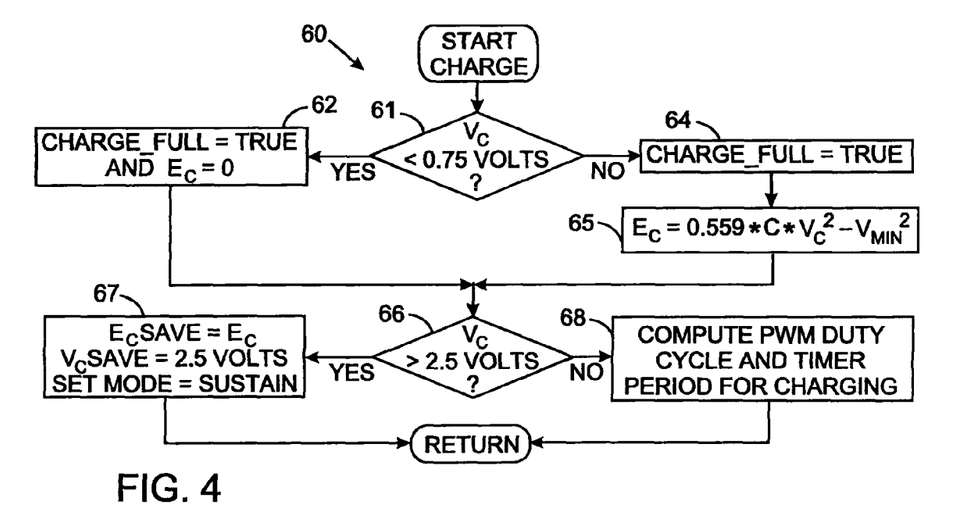
FIG. 4 is a flowchart of a subroutine called by the software program at the start of a capacitor charge mode.

The Start Charge subroutine 60, depicted by the flowchart in FIG. 4, initializes the charge/discharge control circuit 24 to charge the capacitor 22 with the aircraft power supply bus voltage applied to the power supply terminal 20. At step 61, a determination is made whether the capacitor voltage $V_C$ is less than 0.75 volts, which is the minimum capacitor voltage at which the CVR 12 can operate. If so, a variable designated "Charge_Full is set true and the capacitor energy level variable $E_C$ is set equal to zero at step 62. Otherwise, when the capacitor voltage is greater than or equal to 0.75 volts, the Charge_Full variable is set true at step 64 and at step 65, the energy $E_C$ stored in the capacitor is calculated according to the expression:

$$E_C = 0.559 * C * V_C^2 * V_{MIN}^2 \quad (3)$$

where C is the capacitance of the capacitor 22, $V_C$ is the capacitor voltage, and $V_{MIN}$ is the minimum capacitor voltage, e.g. 0.7 volts, at which the CVR 12 can operate.

Then, the Start Charge subroutine 60 advances to step 66 where a decision is made whether the capacitor voltage is greater than the maximum voltage rating of the capacitor, e.g. 2.5 volts. If so, the capacitor energy $E_C$ is stored as a value $E_C$SAVE, a variable designated $V_C$SAVE is equal to 2.5 volts, and the operating mode is set to "Sustain" at step 67. If the capacitor voltage is not greater than 2.5 volts at step 66, a branch occurs to step 68 at which the charge/discharge control circuit 24 is initialized. This is accomplished by computing a pulse width modulation (PWM) duty cycle and a timer period for the control circuit converter in the charging state. The Start Charge subroutine 60 then returns to step 59 of the Initial mode 57 (FIG. 3B) from which the subroutine was called.

Thereafter, the program execution returns to step 46 in FIG. 3A after which steps 46-54 are executed again. Now, upon reaching the branch to mode step 56, the control program enters the Charge mode as that mode was previously set at step 59 in the Initial mode 57.

Figure 3C:
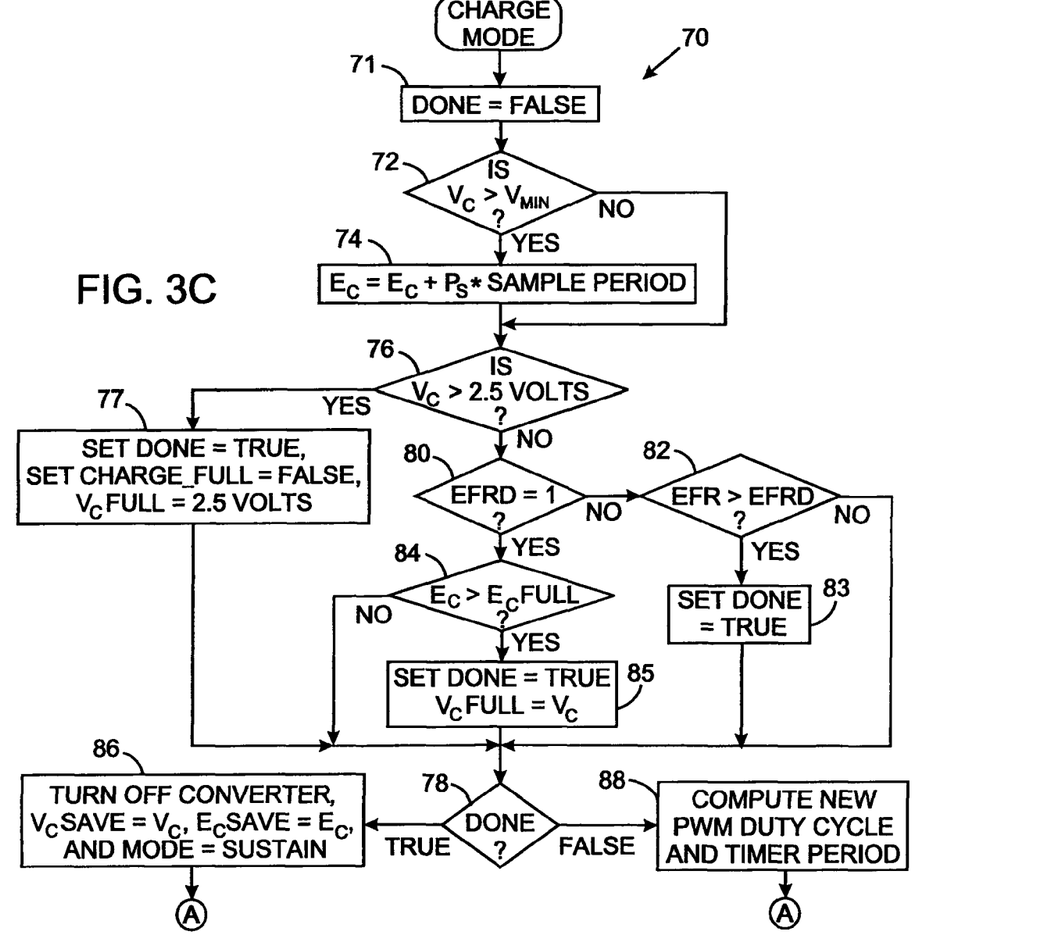

The Charge mode 70 commences at step 71 on FIG. 3C where a variable designated DONE is set false to indicate that charging has not been completed. Then at step 72, a determination is made whether the present capacitor voltage $V_C$ is greater than the minimum capacitor level $V_{MIN}$ required for operation of the CVR 12. If so, a value corresponding to the incremental amount of energy applied to the capacitor 22 during the last sample period is added to a value $E_C$ denoting the total energy on that capacitor and the updated total capacitor energy value $E_C$ is stored at step 74.

Thereafter at step 76, a decision is made whether the present capacitor voltage $V_C$ is greater than the maximum voltage level to which the capacitor 22 can be charged (e.g. 2.5 volts). If so, at step 77 the DONE variable is set true, the Charge_Full variable is set false, and a variable $V_C$FULL, designating the target charge voltage for a fully charged capacitor 22, is set equal to that maximum voltage level before advancing to step 78. Otherwise if at step 76, the capacitor voltage $V_C$ is found to be less than the maximum allowable voltage, the program execution branches to step 80 where is determination is made whether the desired energy ratio EFRD is equal to one, which occurs when there is not an over temperature condition (i.e. the capacitor is at less than 70° C.).

If an over temperature occurred, the program branches to step 82 where a decision is made whether the present charge energy ratio EFR is greater than the desired ratio EFRD. When that condition exists, the DONE variable is set true at step 83 before the program advances to step 78.

On the other hand, when at step 80 the desired energy ratio EFRD is found equal to one, the program branches to step 84. At that point, a determination is made whether the newly updated capacitor energy level $E_C$ is greater than a variable $E_C$FULL, that designates the target charge energy level to which to charge the capacitor 22. That target charge energy level is set during the Discharge mode of the backup power supply, as will be described, or by a stored default value if the discharge mode has never been used. If the newly calculated capacitor energy level $E_C$ is not greater than the target charge energy level $E_C$FULL, further charging is required and the program jumps to step 78. Otherwise, the capacitor 22 is fully charged and at step 85 the DONE variable is set to true and the present voltage level $V_C$ across the capacitor 22 is stored as the target charge voltage level $V_C$FULL for a fully charged capacitor. The execution then advances to step 78.

At step 78, a decision is made whether the DONE variable is true. In that event, the program execution advances to step 86 at which the converter within the charge/discharge control circuit 24 is turned off, a variable designated $V_C$SAVE is set equal to the present capacitor voltage $V_C$, the present capacitor energy level $E_C$ is stored as a variable $E_C$SAVE, and the operating mode is set to Sustain. Otherwise if at step 78 the charging is not completed, the program execution branches to step 88 where a new PWM duty cycle and timer period for the charge/discharge control circuit 24 in the Charge mode are computed and sent by the microcontroller 28 to that circuit. Then from either step 86 or 88, the control program returns to step 46 on FIG. 3A.

From there, steps 46-56 are executed again. If the backup power supply 10 is still in the Charge mode, the program execution will then branch again from step 56 to step 70 in FIG. 3C, thereby repeating the charging loop over and over again until the capacitor is fully charged. When that occurs, the operating mode will be changed to Sustain at step 86 which causes the program execution to subsequently branch from step 56 in FIG. 3A to the Sustain mode.

Figure 3D:
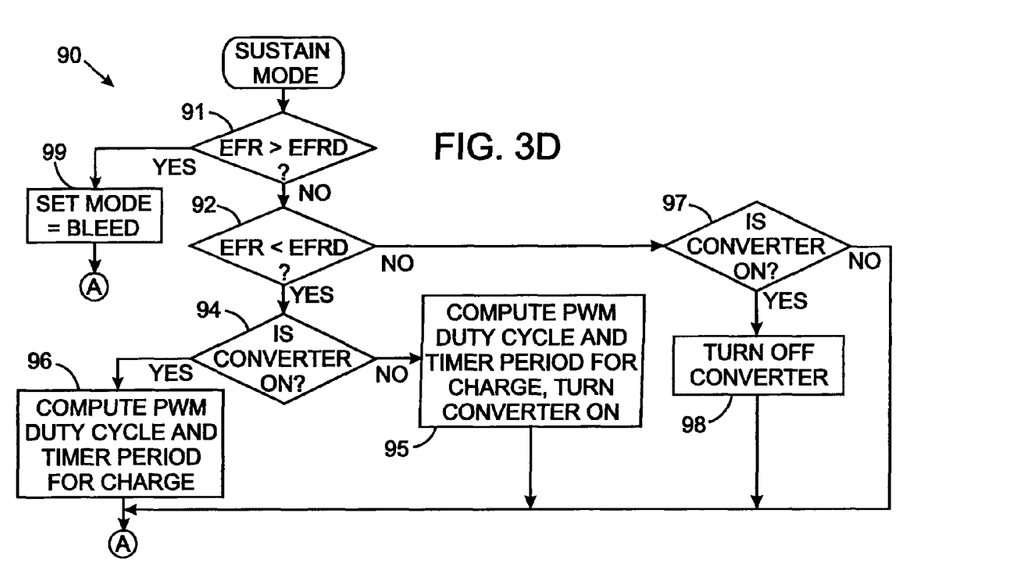

With reference to FIG. 3D, the Sustain mode 90 maintains the capacitor 22 at the fully charged state during operation of the aircraft. To determine whether the charge remains at the desired level, the most recently computed charge energy ratio EFR is compared to the desired ratio EFRD at step 91. If that comparison indicates that the capacitor 22 is not overcharged, the execution advances to step 92 at which another comparison occurs to learn whether the capacitor charge is below the desired level, and if so, the program advances to step 94 where a check is made whether the converter within the charge/discharge control circuit 24 is already turned on. If not, step 95 is executed to set the proper PWM duty cycle and time period for recharging the capacitor to the desired level and then activate the converter. Alternatively, if the converter is already found to be on at step 94, the program branches to step 96 where the PWM duty cycle and timer period are recalculated and fed to the control circuit 24. Upon completion of the steps of the Sustain mode 90, the execution jumps back to step 46.

Returning to step 92 in the Sustain mode, if the present capacitor charge energy ratio (EFR) is not found less than the desired ratio, in essence equal to that desired ratio because of the prior decision at step 90, the program branches to step 97. There a check is made whether the converter is on, in which case it is turned off at step 98 and the Sustain mode routine ends by returning to step 46.

The control program 40 remains in the Sustain mode until power on the aircraft bus 14 is lost, at which time the interrupt routine 30 changes the operation to the Discharge mode. In another situation the mode changes when the capacitor is determined to be overcharged at step 91. In that event, the Sustain mode branches to step 99 where the operating mode is changed to the Bleed mode before returning to step 46 in FIG. 3A. At that time, steps 46-54 are executed again, but upon reaching step 56, a branch occurs to the Bleed mode to cure the overcharge condition.

Figure 3E:
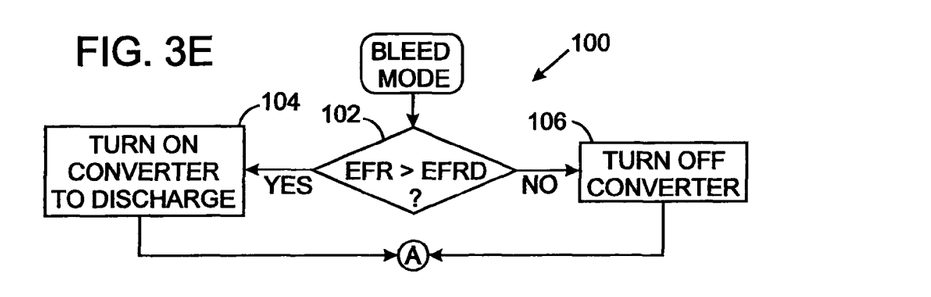

With reference to FIG. 3E, the Bleed mode 100 commences at step 102 where based on the capacitor energy charge ratios, a determination is made whether the capacitor remains in an overcharged state. If so, the converter within the charge/discharge control circuit 24 is turned on at step 104 to discharge the capacitor 22 into the CVR 12 even though power still is present on the aircraft power supply bus 14. When the capacitor returns to the desired charge level, a branch in the bleed mode occurs from step 102 to step 106 where the converter is turned off, terminating the capacitor discharge, before returning to step 42 in the main part of the control program shown on FIG. 3A.

Figure 5:
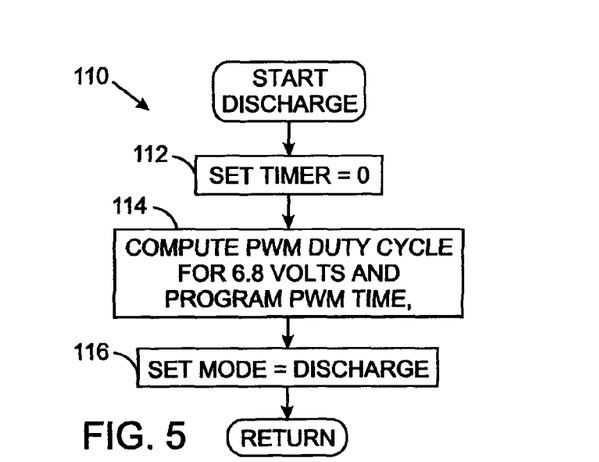
FIG. 5 is a flowchart of a subroutine called by the software program at the start of a capacitor discharge mode.

If the interrupt routine 30 in FIG. 2 detects a failure of power on the aircraft power supply bus 14, the operating mode to Discharge and the Start Discharge subroutine is called to initialize the charge/discharge control circuit 24 to discharge the capacitor 22. The Start Discharge subroutine 110, depicted in FIG. 5, commences at step 112 where a timer, implemented in software by the microcontroller 28, is set to zero and started to measure the length of time that the backup power supply powers the CVR 12. Then at step 114, the charge/discharge control circuit 24 is configured for the discharge operation by computing the appropriate PWM duty cycle to provide 6.8 volts at the power supply terminal 20. That voltage level is the nominal voltage required to operate the cockpit voice recorder 12. Then at step 116, the operating mode of the backup power supply 10 is set to Discharge before returning to step 32 in the sampling interrupt routine of FIG. 2. This not only initiates the backup power supply 10 for discharge operation, but also configures the control program 40 so that the next time the mode branch step 56 is executed, a transition to the Discharge mode will occur.

Figure 3F:
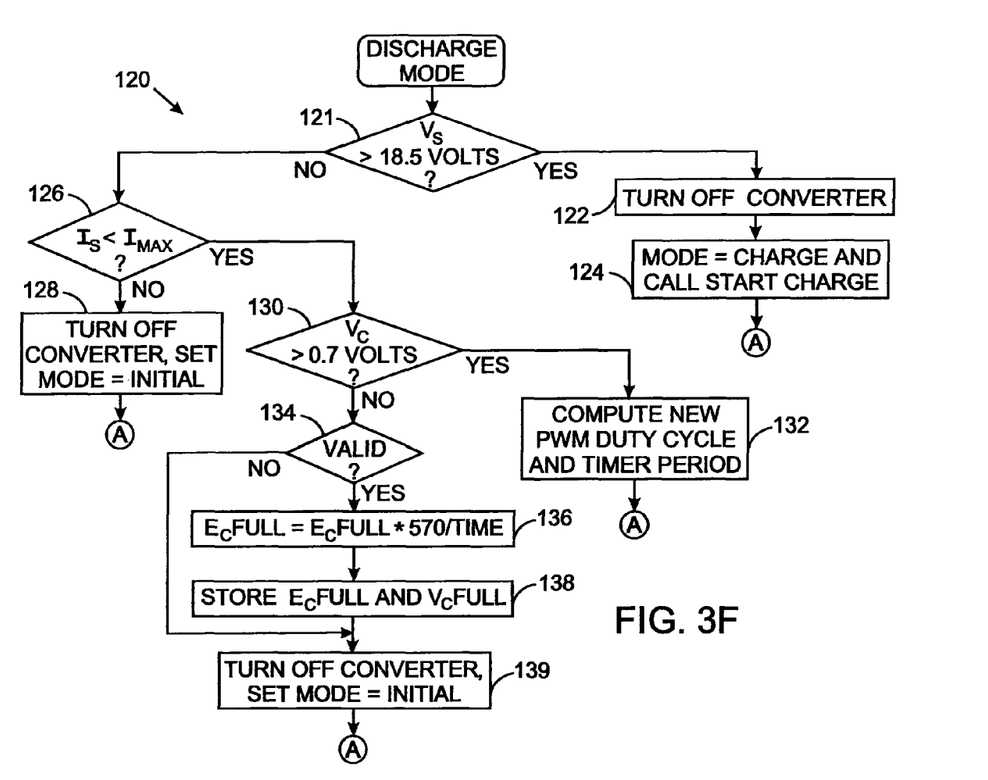

With reference to FIG. 3F, when the control program 40 branches to the Discharge mode 120, the operation commences at step 121 by the microcontroller 28 comparing the recently sensed supply voltage $V_S$ to the nominal voltage on the aircraft power supply bus 14, e.g., 18.5 volts. It should be understood that in the Discharge mode, the backup power supply 10 only applies the minimum voltage level (e.g., 6.5 volts) to the power supply terminal 20 that is required to power the CVR 12. Therefore, at this time, if the voltage level $V_S$ at the power supply terminal 20 approximately 18.5 volts, the microcontroller 28 knows that voltage on the aircraft power supply bus 14 has been restored. If that is the case, the backup power supply 10 is placed into the Charge mode to recharge the storage capacitor 22. That is accomplished by branching to step 122 at which the converter within the charge/discharge control circuit 24 is turned off to terminate the Discharge operation. Then at step 124, the operating mode is set to Charge and the Start Charge subroutine is called. Thereafter the program jumps to step 46 in the main section from step 56 of which a branch then will occur to the Charge mode so that the capacitor can be recharged in the manner previously described.

If, however, at step 121, the inspection of the voltage $V_S$ at the power supply terminal 20 indicates that the aircraft bus power has not been restored, the Discharge mode branches to step 126. At this junction, a determination is made whether the power supply current $I_S$ is greater than a maximum safe level, which indicates that either a short circuit is present or the CVR 12 has placed an unusually large load on the backup power supply 10. In either situation, the execution branches to step 128 at which the converter within the charge/discharge control circuit 24 is turned off and the operating mode is set to the Initial mode before jumping back to step 46.

Assuming that an overload condition does not exist at step 126, the control program branches to step 130 at which a decision is made whether the capacitor voltage $V_C$ has dropped below the minimum level, e.g. 0.7 volts, at which the backup power supply can satisfactorily operate. Dropping below that voltage level indicates that the backup power supply can no longer satisfactorily power the recorder. If that is not the case, a branch occurs to step 132 at which the PWM duty cycle and timer period for the converter within the charge/discharge control circuit 24 are updated based on the sensed voltages and current. The Discharge mode then returns to step 46 to perform another loop through its operation.

Alternatively, if at step 130 the voltage $V_C$ being supplied by the backup power supply 10 is found to be below the minimum voltage level, step 134 is executed to terminate the Discharge mode because the capacitor 22 is too depleted to power the cockpit voice recorder 12 adequately. At this junction, a determination is made whether a valid discharge operation occurred. In other words, a decision is made whether the capacitor was fully charged at the commencement of the Discharge mode, the discharge proceeded in a normal manner, and that an over temperature condition did not occurred. When a valid discharge transpired, the program executes step 136 to compute the amount of energy that was furnished by the capacitor 22 in the Discharge mode, otherwise the program jumps to step 139. To compute the amount of energy discharged from the capacitor, the microcontroller obtains the value from the software timer that indicates how long the capacitor charge was able keep the CVR 12 operating. That amount of time in seconds is divided into the target amount of time (e.g. 600 seconds) that the backup power supply 10 is desired to power the CVR 12. This calculates the proportion of the desired period that the capacitor actually supplied power. That proportional value then is multiplied by the target charge energy level $E_C$FULL to which the capacitor had been charged previously, that is before the Discharge mode commenced. The arithmetic result produced by step 136 is a new value for the target charge energy level $E_C$FULL to which the capacitor should be charged. This energy level is employed at step 84 in the Charge mode to determine when the charge on the capacitor has reached a level that can power the CVR 12 for the desired length of time during a failure of the aircraft power supply bus 14. Then at step 138, the new target charge energy level $E_C$FULL and the target charge voltage level $V_C$FULL, desired for a fully charged capacitor, are stored in the non-volatile memory of the microcontroller 28. Thereafter, the converter within the charge/discharge control circuit 24 is turned off at step 139 and the operating mode is set to the Initial mode before returning to step 46 of the control program.

Therefore every time the aircraft is shut down at the end of operation, the backup power supply capacitor 22 is discharged into the CVR 12 and the amount of time that the CVR continues to operate in that Discharge mode is measured along with the discharge energy that is supplied. If the backup power supply 10 does not continue to operate the CVR for approximately the FAA mandated time period, the target charge energy $E_C$FULL and target charge voltage $V_C$FULL are adjusted accordingly for use in charging the capacitor 22 the next time the aircraft is powered up. This ensures that the backup power supply 10 will be sufficiently charged to power the CVR 12 for at least the FAA mandated operating time without excessively exceeding that time interval which over time adversely affects the life of the capacitor. This dynamic adjustment of the target energy level to which the capacitor 22 is to be charged compensates for changes in the capacitor due to age and other effects.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A method for operating a backup power supply which has a capacitor and which provides electrical power to a consuming device when electrical power from a primary source is unavailable, said method comprising:
    defining a target energy level for the capacitor;
    commencing to charge the capacitor;
    measuring a first amount of energy that is stored in the capacitor during charging of the capacitor;
    terminating charging the capacitor when the first amount of energy stored in the capacitor reaches the target energy level;
    upon electrical power from the primary source becoming unavailable, discharging the capacitor into the consuming device;
    measuring an amount of time during which the discharging occurs; and
    adjusting the target energy level in response to the amount of time.

2. The method as recited in claim 1 wherein measuring an amount of time occurs from commencement of the discharging until a voltage provided by the backup power supply decreases to a predefined level.

3. The method as recited in claim 1 wherein measuring an amount of time occurs from commencement of the discharging until the consuming device ceases acceptable operation.

4. The method as recited in claim 1 wherein measuring a first amount of energy comprises:

periodically sensing voltage across the capacitor and electric current used to charge the capacitor, thereby producing a voltage value and an electric current value;
deriving a power value from the voltage value and the electric current value; and
employing the power value to derive a measurement of the first amount of energy.

5. The method as recited in claim 1 wherein adjusting the target energy level is in response to deviation of the amount of time from a reference value.

6. The method as recited in claim 5 wherein the reference value corresponds to an amount of time that operation of the consuming device is desired to continue after electrical power from the primary source becomes unavailable.

7. The method as recited in claim 1 further comprising measuring a second amount of energy that is discharged from the capacitor into the consuming device which thereby produces a discharge energy value; and wherein adjusting the target energy level comprises deriving a new value for the target energy level in response to the discharge energy value and deviation of the amount of time from a reference value.

8. The method as recited in claim 7 wherein the new value for the target energy level is derived by altering the discharge energy value in proportion to the deviation of the amount of time from the reference value.

9. The method as recited in claim 1 further comprising after terminating charging the capacitor:
    occasionally sensing voltage across the capacitor, and
    if that sensed voltage is less than a given voltage level, recharging the capacitor until voltage across the capacitor reaches the given voltage level.

10. The method as recited in claim 9 wherein the given voltage level is determined by sensing voltage across the capacitor when the first amount of energy stored in the capacitor reaches the target energy level.

11. The method as recited in claim 1 further comprising:
    sensing a temperature proximate to the backup power supply; and
    when the temperature exceeds a given threshold:
        (a) defining a desired energy level as a function of the target energy level and the temperature, and
        (b) terminating charging the capacitor when the amount of energy stored in the capacitor reaches the desired energy level.

12. The method as recited in claim 11 wherein the desired energy level is related to the target energy level inversely to a relationship between the temperature and the given threshold.

13. A method for operating a backup power supply which has a capacitor and which provides electrical power to a recorder in an aircraft when power from a primary source is unavailable, said method comprising:
    commencing to charge the capacitor;
    measuring a first amount of energy that is stored in the capacitor during charging of the capacitor;
    discontinuing to charge the capacitor when the first amount of energy reaches a threshold energy level;
    upon electrical power from the primary source becoming unavailable, conveying electrical current from the capacitor to the recorder, thereby discharging energy from the capacitor;
    measuring a second amount of energy that is discharged from the capacitor;
    measuring an amount of time during which discharging occurs; and
    altering the threshold energy level in response to deviation of the amount of time from a reference value.

14. The method as recited in claim 13 wherein measuring a first amount of energy comprises:
- periodically sensing voltage across the capacitor and electric current used to charge the capacitor, thereby producing a plurality of voltage values and a plurality of electric current values;
- deriving at least one power value from the plurality of voltage values and the plurality of electric current values; and
- employing each power value to derive a measurement of the first amount of energy.

15. The method as recited in claim 13 wherein measuring an amount of time occurs from commencement of the discharging until a voltage provided by the backup power supply decreases to a predefined level.

16. The method as recited in claim 13 wherein the reference value is an amount of time that operation of the recorder is desired to continue after electrical power from the primary source becomes unavailable.

17. The method as recited in claim 13 further comprising:
- sensing a temperature proximate to the backup power supply; and
- defining the threshold energy level in response to an amount that the temperature exceeds a defined threshold.

18. The method as recited in claim 17 wherein the threshold energy level is decreased in proportion to amount that the temperature exceeds a defined threshold.

19. A method for operating a backup power supply which has a capacitor and which provides electrical power to a consuming device when electrical power from a primary source is unavailable, said method comprising:
- charging the capacitor;
- discharging the capacitor into the consuming device;
- measuring an amount of time during which the discharging occurs;
- measuring a first amount of energy that was discharged from the capacitor;
- defining a target energy level in response to the amount of time and the first amount of energy;
- thereafter, commencing to charge the capacitor;
- measuring a second amount of energy that is stored in the capacitor during charging of the capacitor;
- terminating charging the capacitor when the second amount of energy reaches the target energy level.

20. The method as recited in claim 19 wherein measuring an amount of time occurs from commencement of the discharging until a voltage provided by the backup power supply decreases to a predefined level.

21. The method as recited in claim 19 wherein measuring a first amount of energy comprises:
- periodically sensing voltage across the capacitor and electric current used to charge the capacitor, thereby producing a voltage value and an electric current value;
- deriving a power value from each pair of a voltage value and an electric current value; and
- employing a plurality of the power values to derive a measurement of the first amount of energy.

22. The method as recited in claim 19 wherein the target energy level is defined as a function of deviation of the amount of time from a reference value.

23. The method as recited in claim 19 wherein the target energy level is defined by altering the first amount of energy based on how much the amount of time deviates from a reference value.

24. The method as recited in claim 19 further comprising:
- sensing a temperature proximate to the backup power supply; and
- when the temperature exceeds a defined threshold:
  - (a) defining a desired energy level as a function of the target energy level and the temperature, and
  - (b) terminating charging the capacitor when the amount of energy stored in the capacitor reaches the desired energy level.

25. The method as recited in claim 24 wherein the desired energy level is related to the target energy level inversely to a relationship between the temperature and the defined threshold.

* * * * *